US008137646B2

(12) United States Patent
Boocock

(10) Patent No.: US 8,137,646 B2
(45) Date of Patent: Mar. 20, 2012

(54) NON-CHROMATE CORROSION INHIBITOR FORMULAS BASED ON ZIRCONIUM VANADIUM OXIDE COMPOSITIONS

(75) Inventor: Simon Boocock, Liberty Township, OH (US)

(73) Assignee: The Shepherd Color Company, Cincinnati, OH (US)

( * ) Notice: Subject to any disclaimer, the term of this patent is extended or adjusted under 35 U.S.C. 154(b) by 948 days.

(21) Appl. No.: 12/054,985

(22) Filed: Mar. 25, 2008

(65) Prior Publication Data
US 2009/0092839 A1 Apr. 9, 2009

Related U.S. Application Data

(60) Provisional application No. 60/908,197, filed on Mar. 27, 2007.

(51) Int. Cl.
*C01G 31/02* (2006.01)
*C01G 25/02* (2006.01)

(52) U.S. Cl. ......... 423/62; 106/451; 423/71; 423/594.8; 423/594.12; 428/413; 428/416; 428/480

(58) Field of Classification Search ................ 106/451; 423/62, 71, 594.8, 594.12, 62.71; 428/413, 428/416, 480
See application file for complete search history.

(56) References Cited

U.S. PATENT DOCUMENTS

| | | | | |
|---|---|---|---|---|
| 2,623,833 | A * | 12/1952 | King, Jr. et al. | 106/438 |
| 4,358,429 | A * | 11/1982 | Mendelsohn et al. | 423/248 |
| 4,728,744 | A * | 3/1988 | Saleh et al. | 549/239 |
| 4,774,213 | A | 9/1988 | Schneider et al. | |
| 4,843,168 | A | 6/1989 | Drezdzon et al. | |
| 5,246,899 | A | 9/1993 | Bhattacharyya | |
| 5,728,363 | A | 3/1998 | Martin et al. | |
| 5,730,951 | A | 3/1998 | Martin et al. | |
| 5,939,353 | A | 8/1999 | Bhattacharyya et al. | |
| 6,077,885 | A | 6/2000 | Hager et al. | |
| 6,156,696 | A | 12/2000 | Albers et al. | |
| 6,200,650 | B1 * | 3/2001 | Emch | 427/542 |
| 6,221,472 | B1 | 4/2001 | Nosu et al. | |
| 6,403,826 | B1 | 6/2002 | Braig et al. | |
| 6,479,421 | B1 | 11/2002 | Vierheilig | |
| 6,716,370 | B2 | 4/2004 | Kendig | |
| 6,929,736 | B2 | 8/2005 | Vierheilig | |
| 7,022,302 | B2 | 4/2006 | Oza et al. | |
| 7,112,313 | B2 | 9/2006 | Vierheilig | |
| 7,135,075 | B2 | 11/2006 | Buchheit et al. | |

FOREIGN PATENT DOCUMENTS

| | | | |
|---|---|---|---|
| JP | 60103037 | A * | 6/1985 |
| JP | 03279220 | A * | 12/1991 |
| WO | WO 2008/118950 | | 10/2008 |

OTHER PUBLICATIONS

Kamalika Roy, D. K. Pal, S. Basu, Dalia Nayak, Susanta Lahiri. "Synthesis of a new ion exchanger, zirconium vanadate, and its application to the separation of barium and cesium radionuclides at tracer levels." Applied Radiation and Isotopes, vol. 57, Issue 4, Oct. 2002, pp. 471-474, ISSN 0969-8043, DOI: 10.1016/S0969-8043(02)00136-7.*
Eppler, Richard. "Ceramic Colorants". Wiley-VCH Verlag GmbH & Co. KGaA. Ullmann's Encyclopedia of Industrial Chemistry. 2000.*
Cherepanov, B.S. "Peculiarities in the Formation of Zirconium-Vanadium Colors". NIIStroikeramika, Steklo i Keramika, vol. 22, No. 6, pp. 8-12, Jun. 1965.*
Saxena et al. "Polyvanadates of less common metals. Electrometric investigations on the composition of zirconium polyvanadates as a function of pH ". Journal of Inorganic and Nuclear Chemistry (1968), 30(11), 3130-3.*
Saxena et al. "Electrometric study on poly(vanadates) of zirconium(IV) ". Journal of the Institution of Chemists (India) (1969), 41(Pt. 2), 73-8.*
Sohn et al. "Characterization of Vanadium Oxide—Zirconia Catalyst". Journal of Catalysis 159, 170-177 (1996).*
Male et al. "Thermolytic Molecular Precursor Route to Active and Selective Vanadia—Zirconia Catalysts for the Oxidative Dehydrogenation of Propane". Journal of Catalysis 194, 431-444 (2000).*
Machine translation of JP 60-103037 (1985).*
U.S. Appl. No. 60/908,197, filed Mar. 27, 2007, Boocock.
Alblas, B.P. et al., "The Effect of Chloride Contamination on the Corrosion Surfaces: A Literature Review," Jr. PCE (Feb. 1997) p. 16-25.
Buchheit et al., Progress in Organic Coatings, vol. 47 (2003)pp. 174-182.
Kodakov et al. Journal of Catalysis, vol. 177 (1998) pp. 343-351.
Morcillo., M., Progress in Organic Coatings, vol. 36, issue 3 (Jul. 1999) pp. 137-147.
U.S. Appl. No. 60/793,237, filed Apr. 16, 2006, Kubota.
U.S. Appl. No. 60/983,858, filed Sep. 20, 2007, Boocock.
U.S. Appl. No. 12/211,390, filed Sep. 16, 2008, Boocock.
U.S. Appl. No. 12/211,459, filed Sep. 16, 2008, Boocock.
Weller, M.T., "Where zeolites and oxides merge: semi-condensed tetrahedral frameworks," J. Chem. Soc., Dalton Trans. (2000) pp. 4227-4240.

* cited by examiner

*Primary Examiner* — Callie Shosho
*Assistant Examiner* — John Freeman
(74) *Attorney, Agent, or Firm* — Steven J. Goldstein; Frost Brown Todd, LLC

(57) ABSTRACT

A mixture of zirconium hydroxides or zirconium basic carbonate with vanadium oxide (V205) co-reacts in high temperature aqueous slurry to form respectively an amorphous material, believed to be based on a zirconium analog of a zeolite structure, and a solid solution of zirconium oxide with vanadium oxide. The subject compositions, free of hexavalent chromium, are highly effective in providing blister-free corrosion prevention in typical coil and aerospace grade epoxy primer and color coat combinations.

17 Claims, 3 Drawing Sheets

NON-CHROMATE CORROSION INHIBITOR FORMULAS BASED ON ZIRCONIUM VANADIUM OXIDE COMPOSITIONS

TECHNICAL FIELD

This application is related to and claims priority from U.S. Provisional Patent Application No. 60/908,197, filed Mar. 27, 2007, incorporated herein by reference.

This invention relates to corrosion inhibitive pigmentary compositions free of chromium. More specifically, these compositions are essentially free of hexavalent chromium {Cr(VI)}. The inventive compositions are useful in coatings applied as the primer component of a coating system intended to prevent corrosion of Aluminum (2024-13) or Hot-Dip Galvanized or Zn—Al coated (Galvalume) coil stock.

BACKGROUND OF THE INVENTION

Chromium in the form of Chromate (Cr04-) is a widely employed and highly effective corrosion preventive pigment. It is the de facto standard for corrosion prevention in primers applied to aluminum, particularly aerospace aluminum stock (2024-T3, and certain 7000 series alloys, for instance). In addition, hexavalant chromate in the form of strontium-chromate is the benchmark for corrosion prevention in coil coating primers (whether based on Epoxy-Melamine, Polyester or other binder systems) when applied to Zinc, Zinc-Aluminum or similar galvanized or electro-galvanized coil stock.

There has been extensive activity to eliminate hexavalent chromium from these primer systems, which efforts are driven by two related impeti. First, hexavelent chromium is toxic, thus efforts to identify a performance-equal substitute to strontium chromate are easily understood. Secondly, there are directives promoted in Europe that require a limit on chromium content, such that a manufactured article may more readily be recycled.

For the foregoing reasons there have been numerous academic research projects[1] and an untold number of industry product development exercises devoted to finding a replacement for strontium-chromate. There is also a substantial patent literature history describing some of these efforts by industry.

[1]Progress in Organic Coatings 47 (2003) 174-182—Buchheit et al.

In almost every case examined however, there appears to be one or more flaws in the touted benefits of the inventive compounds. Typically, the claimed chromate-free inhibitor is in fact not demonstrated in a coating system, but rather in a primer alone. This may disguise a performance flaw, for example, that the inhibitive pigment leads to blistering. The blistering may result either from traces of water-soluble salts that are the by-products of the pigment synthesis, or from the intrinsically high solubility of the touted composition itself.

Sometimes, the touted composition is offered based on data for a coating system that is applied only to ferrous metal surfaces. Though it may be free of chromium, the anti-corrosive pigment provides insufficient electrochemical over-potential to prevent corrosion of highly reactive metals such as aluminum or zinc. Finally, it is often the case that the benefit of a chrome-free anti-corrosive pigment is made on the basis of unrealistically short accelerated testing; which is deemed unreliable by those skilled in the art. Indeed, many patented offerings, when independently tested, fail to deliver the long duration of outstanding corrosion prevention expected of strontium chromate in benchmark accelerated tests.

The present invention overcomes these deficiencies in previous chrome-free anti-corrosive pigments. It provides that the inventive compositions are able to deliver performance on a par with strontium chromate when evaluated directly alongside the same in realistic coating systems, appropriate for the substrate and end-use application. The present invention in one preferred form does use a ratio of elements in its composition that is somewhat similar (though clearly different) to ones previously disclosed, though in an entirely difference field of application, as a catalyst[2]. It differs from the prior disclosed systems in terms of the ratios of elements used to make an amorphous solid solution of zirconium and vanadium oxides or hydroxides. The approximate range of composition included in this invention is between $Zr_2V_3O_{12}.nH_2O$ and $Zr3V_4O_{16}.nH_2O$, where n is between 0 and 6.

[2]Journal of Catalysis: 177, 343-351, (1998); Khodakov et al.

The present invention affords finished compositions within the above ranges that are, by virtue of the synthetic method employed, essentially free of soluble salts. Furthermore, due to the lack of tracer salt contaminants, their resistance to blistering in typical coating systems is greatly improved.

The use of vanadium containing compounds as a component of an anti-corrosive surface treatment on reactive metals, such as 2024-T3 aluminum is not in and of itself novel. In fact, a prior application by Buchheit et al describes the use of vanadate in a chromate-free conversion coating. These are different from the present inventive compositions in that they are not used as pigments in the primer formula, but rather provide a solid base on the aluminum that will improve adhesion of a subsequently applied anti-corrosive primer and any topcoat.[3]

[3]U.S. Pat. No. 7,135,075—Corrosion resistant coating with self-healing characteristics, Buchheit et al, issued Nov. 14, 2006.

Vandium salts or compounds in a primer coating formula also have been disclosed in prior patent applications, such as that to Hager et al in U.S. Pat. No. 6,077,885. The disclosure in the '885 patent is distinct from that in the present application on the following grounds. The '885 patent explicitly describes the use of relatively soluble alkali metal vanadate salts such as sodium metavanadate, with or without the addition of other compounds such as cerium acetate or cerium oxalate as direct additions to a primer formula. Though they claim good blistering resistance after accelerated salt fog testing, it should be noted that claim is made for a primer alone, in which the likelihood of blistering is greatly reduced. Moreover, no comparative performance against a positive control in which Strontium Chromate is the anti-corrosive pigment is provided. Thus, the actual benefit in use of the primers made in accordance with the '885 patent over the standard commercial product cannot be assessed.[4]

[4]U.S. Pat. No. 6,077,885—Chromate-free protective coatings, Hager et al, issued Jun. 20, 2000.

Zirconium compounds have also been employed in anti-corrosive primers in substitution for chromate anti-corrosive pigments. One example is U.S. Pat. No. 6,716,370, which discloses zirconium containing supra-molecular oxo-anion compounds which may be used as a component of a primer. These materials do not however contain any vanadate or vanadium containing ions. The compositions disclosed in U.S. Pat. No. 6,716,370 are based upon complex molybdenum and/or tungsten and/or phosphorus compounds with silicon and are thus clearly different from the present invention.[5]

[5]U.S. Pat. No. 6,716,370—Supramolecular oxo-anion corrosion inhibitors, Kendig, issued Apr. 6, 2004.

Various organic compounds, based either on complex carboxylic acids or organo-phosphonic acids and theyr salts with zirconium, bismuth, alkali earths and the like are disclosed in U.S. Pat. No. 6,403,826, or references therein, assigned to Ciba Geigy. As was the case with the earlier cited Kendig patent, these are clearly different in nature from the zirconium vanadium compositions disclosed herein.[6]

[6]U.S. Pat. No. 6,403,826—Corrosion-inhibiting coating composition for metals, Braig et al, issued Jun. 11, 2002.

BRIEF SUMMARY OF THE INVENTION

The present invention relates to the chemistry, processes and means of application for anti-corrosive pigments substantially free of hexavalent chromium. Said pigments may be used in direct substitution for strontium chromate in primers intended for zinc-coated or zinc-alloy coated coil stock. Said pigments may be used in direct substitution for strontium chromate in primers intended for aluminum alloy surfaces.

The chemistry involves the reaction of zirconium hydroxides or basic carbonates with vanadium oxide in aqueous slurry held at a temperature between 65 C and 130 C and a pressure between ambient and 5 MPa. Specifically, the acidic vanadium oxide digests the zirconium sources and self-assembles the zeolitic framework (from zirconium hydrate) or solid solution (from zirconium basic carbonate, or zirconium oxy-hydroxide). One zirconium source (Zirconium Hydrate) yields a deeply orange colored end product, along with an increase in volume of the solid. This may be considered as a preferred embodiment of the invention. A second type of Zirconium raw material, the oxy-hydroxide or Basic Zirconium Carbonate, on reaction with Vanadium Pentoxide, yields a yellow to buff colored, free-flowing powder as the product. The intensity of the color depends on the ratio of Zirconium to Vanadium employed. Those products made from a reaction in which the ratio of Zirconium to Vanadium is below 1:2 tend to be yellow in color. The products of the reactions in which the ratio of Zirconium to Vanadium is greater than 1:2 are characteristically buff in color. The precise point at which the color of the finished product shifts from yellow to buff is not defined herein.

In principal, the use of other starting raw materials than those employed in the examples below may be contemplated and would be apparent to those skilled in the art, based on the disclosure of this application. In most instances, however, there are deficiencies in the use of alternative synthetic pathways to those defined herein that result from such methods.

For instance, it may be possible to obtain a simple 1:2 ratio of Zirconium to Vanadium though the reaction of alkali—metal vanadates, such as the Sodium Vanadates with Zirconium Oxychloride. The primary-product from such a reaction is likely to be ZrV2O7. The by-product of such a metathesis is Sodium Chloride—which is a highly soluble salt that, if incompletely removed from the primary product, will have a detrimental impact on blistering when the primary product is employed in a coating system. Furthermore, the presence of chloride as a contaminant would itself act to promote corrosion.[7]

[7]B. P. Alblas, et al., The Effect of Chloride Contamination on the Corrosion of Steel Surfaces: A Literature Review, Jr. PCE, February, 1997, p. 16

The detrimental impact of the chloride ion on coating performance and its ability to promote corrosion can be avoided through the use of alternative Zirconium raw materials, such as Zirconium Oxy Nitrate. Though now free of chloride by-product the reaction mixture would still contain substantial soluble salt, this would lead, if incompletely removed, to blistering in a coating system.[8]

[8]Progress in Organic Coatings, Volume 36, Issue 3, July 1999, Pages 137-147

Moreover, regardless of the particular choice of reactants in such a metathetical reaction, it is likely to be less easy to arrive at the type of finished products, with a broad range of Zr:V ratios, as those provided by the present invention. This is due in part to the unique character of Vanadium Pentoxide as a reactant. This will, under conditions of mild heat, begin to dissolve into solution—decreasing the pH of the slurry. Because of this shift to an acidic pH, polynuclear oxo-metallate clusters will dominate as the dissolved form of Vanadium ion. Such polynuclear clusters bear a higher Vanadium ion to charge ratio than is presented by Ortho and Meta Vanadates. In fact, the Vanadium atom to ion count in the dominant species formed as an intermediate in our preferred reaction could be as high as 10:6. (for the decavanadate ion). By way of contrast, the Vanadium atom to ion charge count for the orthovanadate ion is 1:3, while for the metavanadate ion it is 1 to 1 This difference has an impact on the solution reaction between Zirconium Oxy Chloride or Oxy Nitrate and Alkali metal Vanadates. These will generally tend to form finished products that are 1:1 reaction products per charge unit for the displaced anions present in the alternative zirconium raw materials. Notably, while some such products will fit within the range of composition defined within this specification, they will bear the aforementioned salt by-products that are absent when the preferred embodiments are practiced.

Finally, another alternative zirconium raw material might be the widely available Zirconium Dioxide, ZrO2. However, the ability of Vanadium Pentoxide in heated slurries to digest zirconia powders is limited. In fact, to obtain a solid solution of Vanadium Oxide in Zirconium Oxide typically demands the use of high temperature calcination of an intimate mixture of the solid powders. As is known to those skilled in the art, the solubility of Vanadium oxide in such a calcined pigment is significantly lower than the ratios achieved herein.

The materials of the present invention are preferably free from trace salts selected from hexavalent chromium salts, alkali metal chlorides, alkali metal nitrates, alkali metal sulfates, and mixtures thereof. Further, the materials of the present invention preferably are such that the conductivity of a 10% (by weight) slurry of the pigment in water is less than about 160 micro-siemens.

The process is, as described above, a hydrothermal process, which may be conducted under ambient pressure at temperatures up to the boiling point of the carrier fluid in which the slurry is made, or under pressure, as in a hydrothermal reactor, at temperatures above the boiling point of the carrier fluid under Standard Temperature and Pressure, STP.

One preferred form of the invention, using highly active zirconium hydrate, affords a deeply orange colored pigment which is essentially free of extraneous soluble salts. An alternative embodiment of the invention, that employs Zirconium Oxy Hydroxide and/or Zirconium Basic Carbonate yields a yellow to buff colored, free-flowing powder—the color being dependent on the precise Zr:V ratio.

DETAILED DESCRIPTION OF PREFERRED EMBODIMENTS

Figure 1:
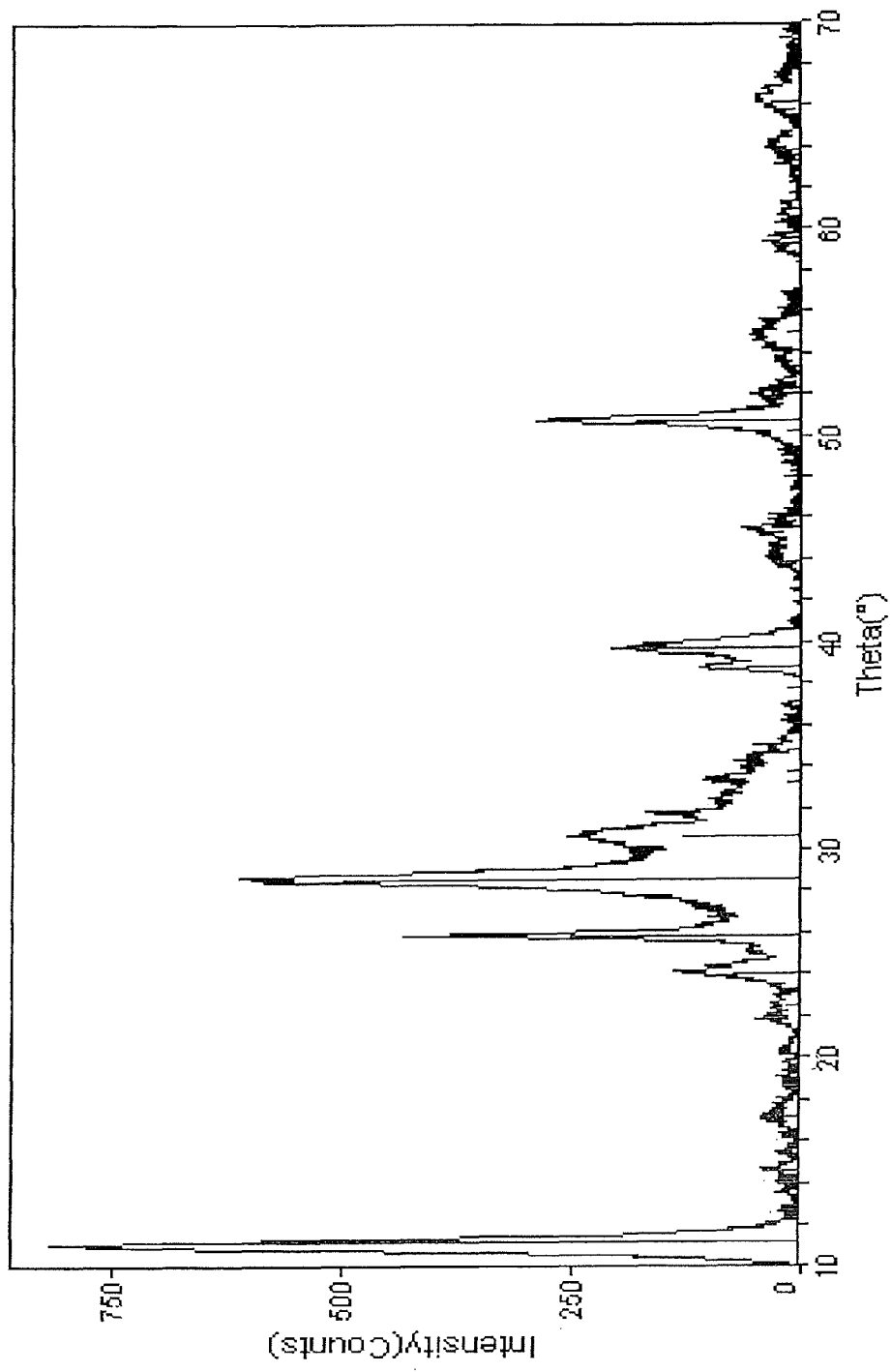
FIG. 1 is an XRD pattern of a material made according to Example 1 at 1 Zr:V ratio near 3:4.

In accordance with the foregoing summary, the following represents a detailed description of preferred embodiments of the invention.

Example 1

A slurry is formed of freshly prepared Zirconium Hydrate $(Zr(OH)_4)$ and Vanadium Pentoxide in water in an elemental ratio of Zr:V of about 3:4. The ratio of the mass of water to the total mass of precursor oxides and hydroxides is no less than about 4:1. The slurry is homogenized by mechanical stirring and then raised in temperature by any convenient means to between about 65 C and 80 C. At this temperature, the solubility of the vanadium oxide in the reaction fluid becomes sufficiently high that polynuclear vanadium oxoanions predominate, such as the decavanadate ion $\{V10O28^\wedge-6\}$. Over a period of several hours, but less than a day, the reaction between the individual precursor oxides and hydroxides proceeds to completion. This event is accompanied by an increase in both the temperature and viscosity of the slurry. An orange brick-red solid cake forms. When recovered and dried, the mass of product is typically 96% of theory for a material having a stoichiometry of $Zr_3V_4O_{16}$. The product may be reduced to a pigmentary form suitable for incorporation into anti-corrosive primer formulas by any common means of comminution.

Example 2

A slurry is formed of zirconium basic carbonate and vanadium pentoxide in water. The elemental ratio of Zr:V in said slurry ranges from about 3:1 to about 3:4. The ratio of the mass of water to the total mass of precursor oxides and hydroxides is no less than about 4:1. The slurry is homogenized by mechanical stirring and then raised in temperature by any convenient means to about 80 C. Over a period of at least 18 hours, but less than 2 days, the reaction between the individual precursor oxides and hydroxides proceeds to completion. A precipitate forms, the color of which deepens from pale yellow to a buff yellow as the Zr:V ratio is increased from 3:1 to 3:4. For the case when the Zr:V ratio is 3:4, when recovered and dried, the mass of product is typically 96% of theory for a material having a stoichiometry of $Zr_3V_4O_{16}$. The product may be reduced to a pigmentary form suitable for incorporation into anti-corrosive primer formulas by any common means of comminution.

Example 3

Pigments made in accordance with Examples 1 and 2 are incorporated into coil primers in accordance with the formula in Table 1. As positive control, a strontium chromate pigmented primer is employed. As a negative control, a primer composition in which all anti-corrosive materials are substituted for inert pigments (TiO2 and Talc) is employed. Each primed surface is then top coated with a compatible coil coating system as shown in Table 2. The relative edge undercutting and scribe undercutting performance of these systems after 1,000 Hours of Salt Fog Exposure is depicted in Table 4.

The Salt Fog Exposure testing is conducted in accordance with ASTM B117 "Standard Practice for Operating Salt Spray (Fog) Apparatus"

Samples were evaluated for blistering in accordance with ASTM D714, "Standard Test Method for Evaluating Degree of Blistering of Paints."

The degree of undercutting at a deliberately placed scribe is evaluated in accordance with ASTM D1654, "Standard Test Method for Evaluation of Painted or Coated Specimens Subjected to Corrosive Environments."

For those samples with a bare cut edge, edge undercutting is evaluated in accordance with ASTM D1654, "Standard Test Method for Evaluation of Painted or Coated Specimens Subjected to Corrosive Environments."

Example 4

Pigments made in accordance with Examples 1 and 2 are incorporated into a 2-pack Epoxy coating applied to Aluminum 2024-T3 panels. The general primer formula used is depicted in Table 3. As positive control, a strontium chromate pigmented primer is employed.

As a negative control, a primer composition in which all anti-corrosive materials are substituted for by inert pigments (TiO2 and Talc) is employed. Each primed surface is then top coated with a compatible Epoxy topcoat. The relative edge undercutting and scribe undercutting performance of these systems after 1,000 hours of Salt Fog Exposure is depicted in Table 5.

TABLE 1

Coil Coating Primer System—Positive Control

| Component | Wt. | Solids | |
|---|---|---|---|
| Dynapol LH820-04 (Polyester Resin—Degussa Corp) | 50 | 0.5 | 25 |
| Cab-O-Sil M-5 (Amorphous Silica—Cabot Corporation) | 0.4 | 1 | 0.4 |
| Filler-Talc (Luzenac Division of Rio Tinto Corp.) | 4 | 1 | 4 |
| Tiona 696 (Rutile Titanium Dioxide—Millenium Chemical Corp.) | 8 | 1 | 8 |
| SrCrO4 (HM Habich AG—Grade ATG) | 6.2 | 0.65 | 4.03 |
| MPA (Solvent—Sherwin-Williams) | 7.6 | 0 | |
| Make Grind from above in Eiger Mill to Hegman of 7 | | | |
| Epikote 1004 (HMW Epoxy Resin—Resolutions Corp) | 6 | 0.5 | 3 |
| Vestanat EP-B 1481 (Hardener—Degussa Corp.) | 6 | 0.65 | 3.9 |
| DabcoT12N (Tin based Catalyst—Degussa Corp.) | 1 | 0.1 | 0.1 |
| Nacure 1953 (5% in IPA) (Acid Catalyst—King Industries) | 2 | 0.05 | 0.1 |
| Cymel 303 (80% in IPA) (hexamethoxymethylmelamine resin—Cytec) | 2.5 | 1 | 2.5 |
| Byk 355 (20% in Naptha) (Leveling additive—BYK Corp). | 3 | 0.1 | 0.3 |
| Naptha 150 (Solvent—Ashland) | 3.3 | 0 | 0 |

Let Down on Cowles at <3,000 RPM with the above components

Samples using examples of the inventive pigments from Examples 1 and 2 are made by substitution of strontium chromate on a weight to weight basis. To maintain the ratio of critical pigment volume to pigment volume concentration within the bounds defined by the above formula, adjustments are also made in the loading of Talc or TiO2 (Kronos 2059) in the above formula.

Primer films are drawn down on Hot-Dip Galvanized or Galvalume panels, to which a Henkel 1421 pretreatment had been applied, at 7-microns target DFT using a wire-wound rod. The films are cured for 35-40 seconds with an oven temperature of 343 C to achieve a peak metal temperature of 225 C.

TABLE 2

Polyester Topcoat Formula

| Grind | CL | Grams |
|---|---|---|
| Kronos 2310 (Rutile Titanium Dioxide = Kronos) | 5706 | 650 |
| Bayferrox M 130 (Red Iron Oxide—Bayer) | | 65 |
| Dynapol LH530-02 (Polyester Resin—Dyanpol) | 4376 | 321.75 |
| Solvesso 200 (VMP Naptha 200—Exxon) | 4533 | 125.6 |

TABLE 2-continued

Polyester Topcoat Formula

Grind above in Eiger Mill to Hegman of 6

| Letdown Base | Grams | Solids |
|---|---|---|
| Dynapol LH530-02 (Polyester Resin—Dyanpo) | 300 | 60% |
| Cymel 303 (hexamethoxymethylmelamine resin—Cytec) | 105 | 99% |
| Solvesso 200 (VMP Naptha 200—Exxon) | 150 | 0% |
| BYK 392 (Defoaiming additive BYK Corporation) | 10 | 50% |
| Eiger milled continuously at 3500 rpm using 1.0-1.2 SEPR beads | | Grind |
| Grind—Proportion Used in Final Mix | | 31.0 |
| Letdown Proportion Used in Final Mix | | 36.0 |

Apply to substrate using a #30wwr, 50 sec cure at 343°

TABLE 3

2-Component Epoxy Primer Formula

| Material | Wt. | Percent |
|---|---|---|
| Part A | | |
| Epon 828 (Epoxy Resin—Resolutions) | 157.95 | 17.02% |
| Heloxy Modifier 8 (Resolutions) | 30.01 | 3.23% |
| Suspeno 201-NBA (Rheoligical Modifier, Poly-Resyn) | 5.48 | 0.59% |
| Nicron Talc 503 (Luzenac/Rio Tint0) | 43.63 | 4.70% |
| N-Butyl Acetate (Thinner—Sherwin Williams) | 322.30 | 34.73% |
| Gasil 23F Silica Gel (Filler—Matting Agent—Ineos Silica) | 27.05 | 2.91% |
| Kronos 2310 (Rutile TiO2—Kronos) | 21.16 | 2.28% |
| Pigment (Varies with trial) | 300.50 | 32.38% |
| Disperbyk 111 (Wetting Additive—BYK Corp) | 20.000 | 2.15% |
| Grind above to Hegman of 5-6 in Eiger Mill | | |
| Part B | | |
| Epikure 3155 HY283 (Crosslinker—Resolutions) | 711.03 | 86.28% |
| Tertiary Amine K54 (Amine Curing Agent—Resolutions) | 55.22 | 6.70% |
| NBA (Solvent/Thinner—Sherwin Williams) | 57.85 | 7.02% |

Ingredients for Part B are mixed using high speed dispersion with a Cowles Blade. Components A and B are mixed with low-speed dispersion in a ratio of 5:1 by weight. Apply by wire-wound rod to target DFT of 1.0-1.5 mils.

The above generic formula is used for the generation of all primer samples including strontium chromate, Examples 1 and 2 above, and a negative control wherein all the strontium chromate is substituted for by Tiona 696 Ti02. This same negative control version was also used as the topcoat for all samples.

TABLE 4

Edge Undercutting LH820 Polyester Coil Coatings on Henkel 1421 treated Hot-dip galvanized coil stock

| Name | Example | 101 h | 147 h | 218 h | 334 h | 406 | 482 h | 1016 h |
|---|---|---|---|---|---|---|---|---|
| 131-1 D1 | | 0 | 0 | 0 | 2 | 5 | 5 | 5 |
| 13 I-I D2 | | 0 | 0 | 0 | 2 | 3 | 3 | 2 |
| 132 D1 | 2 | 0 | 0 | 0 | 0 | 1 | 2 | 4 |
| 132 D2 | 2 | 0 | 0 | 0 | | 2 | 3 | 4 |
| 140-1 A1 | | 0 | 0 | 0 | 1 | 1 | 3 | 8 |
| 140-1 A2 | | 0 | | | 7 | >10 | >10 | 9 |
| 140-2 A1 | | 0 | | | 3 | 6 | 6 | 30 |
| 140-2 A2 | | 0 | | | 3 | 4 | 5 | 10 |
| 140-3 A1 | | 0 | | | 2 | 3 | 4 | 13 |
| 140-3 A2 | | 0 | 0 | | 3 | 5 | 9 | 14 |
| 140-4 A | | 0 | | 3 | 5 | 6 | 7 | 9 |
| 140-4 A2 | | 0 | 0 | | 9 | 8 | 8 | 10 |
| 140-5 A1 | | 0 | | 3 | 8 | 6 | 7 | 6 |
| 140-5 A2 | | 0 | 0 | 0 | 3 | 4 | 8 | 7 |
| 140-6 A | | 0 | 0 | 0 | 2 | 2 | 6 | 8 |
| 140-6 A2 | | 0 | | | 2 | 3 | 6 | 10 |
| 140-7 A1 | | 0 | | | 2 | 3 | 3 | 8 |
| 140-7 A2 | | 0 | | | 7 | 8 | 10 | 9 |

The trials 140-1 through 140-7 are commercial anti-corrosive pigments.

Trials 131-1 and 132 represent primer samples made with the primer formula described in Example 3, using pigments synthesized in accordance with Examples 1 and 2 respectively. These are compared in performance to a number of commercially available "chrome-free" anti-corrosive pigments and Strontium Chromate. All samples are topcoated with the Polyester topcoat paint made using the formula depicted in Table 2.

140-1 is strontium chromate as supplied by Heubach. Trial 140-2 uses an equal weight of Halox 400 in place of strontium chromate. 140-2 uses an equal weight of the mixture, Halox 400 (95%) Halox 650 (5%) in place of strontium chromate. 140-3 uses Heubach SAPP pigment as a 1:1 substitute for strontium chromate. 140-4 uses Heubach SRPP in place of strontium chromate: 1:1 by weight. 140-5 uses an equal weight of the following mixture in place of strontium chromate, Heucorin RZ0407 (5%) Heubach SAPP (95%). 140-6 uses an equal weight of the following mixture in place of strontium chromate: Heucorin RZ 0407 (5%) Heubach SRPP (95%). 140-7 uses the following mixture at equal weight in place of strontium chromate, Halox 400 (75%) Shieldex C303 (25%).

Halox 400 is an anti-corrosive pigment, free of chromium, largely consisting of Barium Boro-Phosphate. It is manufactured by Halox Corp.

Halox 650 is an organic corrosion inhibitor, recommended by Halox for use, in combination with inorganic inhibitors, in coil coating primers. It is manufactured by Halox Corp Heubach SAPP and SRPP are both Strontium aluminum polyphosphate hydrate anti-corrosive pigments, sold as chromium-replacement or chromium free anti-corrosives by Heubach.

Heucorin RZ0407 is an organic corrosion inhibitor sold by Heubach, based on zinc-5-nitroisophthalate.

Shieldex C303 is a Zeolite-based corrosion inhibitor sold by WR Grace & Co for use in combination with other corrosion inhibitors.

Though records are kept of the degree of blistering, these are not shown as no significant blistering is observed. Ratings are performed at the hourly schedule indicated by the column headers, beginning at the $4^{th}$ day and then on a weekly basis. The results shown in Table 4 describe the degree of undercutting in mm from edge. As can be seen, many of the commercially available chromium free pigments (140-2 through 140-7) show undercutting at edge which is greater than that shown by Strontium Chromate (140-1). In those instances where a chromium-free commercial offering seems to approach Strontium Chromate performance—e.g., 140-5, it is not markedly better. By contrast, the edge undercutting performance of the inventive compositions, as used in samples 131-1 and 131-2, are clearly less prone to undercutting than the control (140-1) or competitive (140-2 through 140-7) pigments.

TABLE 5

Scribe Undercutting and Blistering Data for Epoxy Coated Samples on 2024-T3 Aluminum
After 1000 Hours Exposure to Salt Fog Testing in accordance with ASTM B117, the following undercutting is measured on samples and controls coated in accordance with Example 4, using pigments from Examples 1 in the primer compositions.

| Sample | Anti-Corrosive Pigment | Undercutting at Scribe (mm)/ASTM D1654 | Hours of Salt Fog Exposure |
| --- | --- | --- | --- |
| 82A | SrCrO4 (Heubach) | 0 | 1000 |
| 141B | Example 1 | 0 | 1000 |

Structural and Compositional Data—The structural and compositional data for the inventive compositions is open to some debate. A sample made in accordance with Example 1 at a Zr:V ratio near 3:4 was CP0935-146-T-8-2. FIG. 1 shows a very broad set of peaks in its XRD pattern. Though no sodium is present in the starting Zirconium Hydroxide raw material, the closest pattern assignment implies the material is isostructural with Na2V6O16.3H2O.

XRF analysis of this material clearly shows no measurable Sodium to be present, only Vanadium, Zirconium and natural traces of Hafnium being found.

Figure 2:
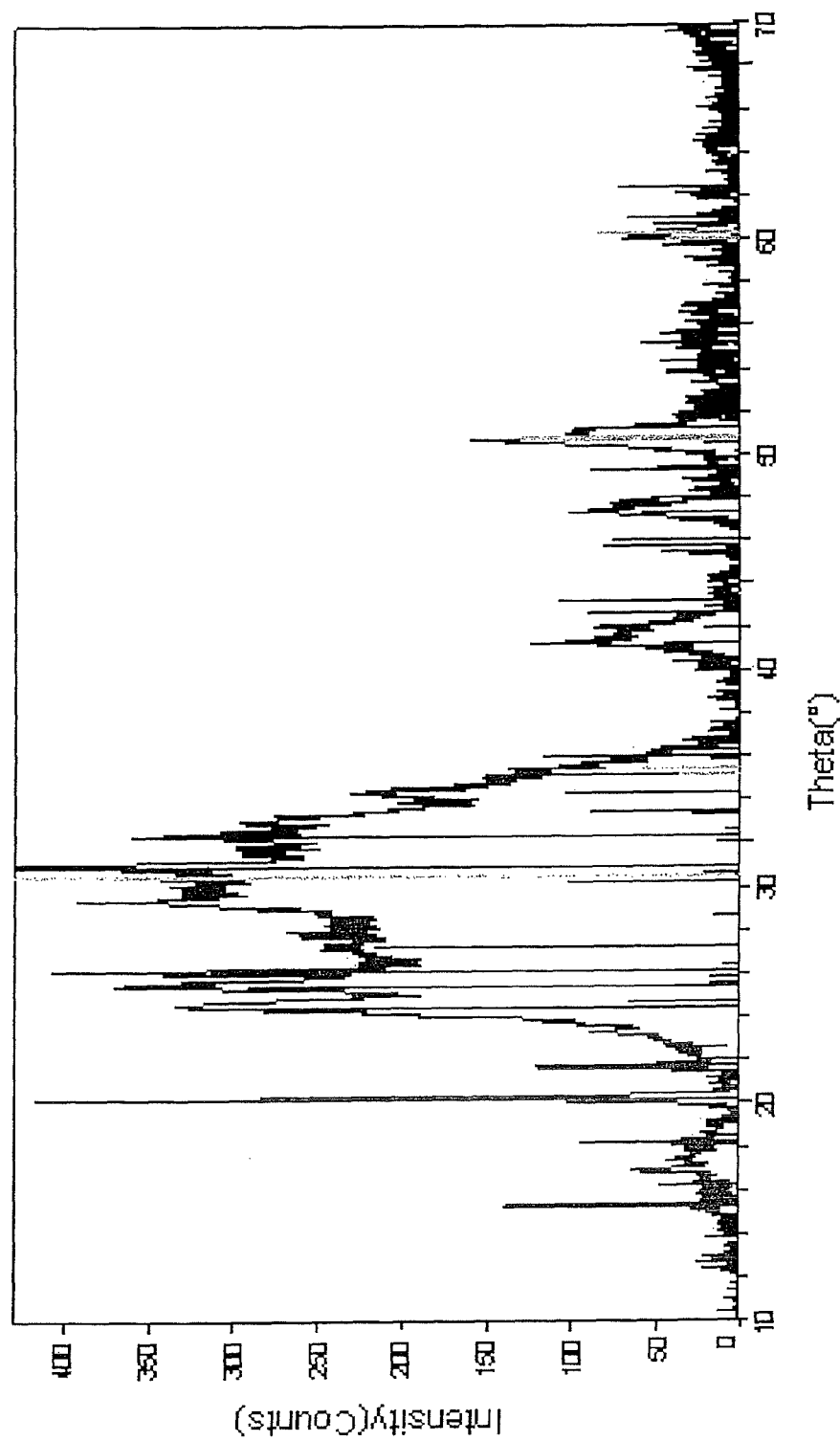
FIG. 2 shows an XRD pattern for sample CPO935-133 made in accordance with Example 1.
Figure 3:
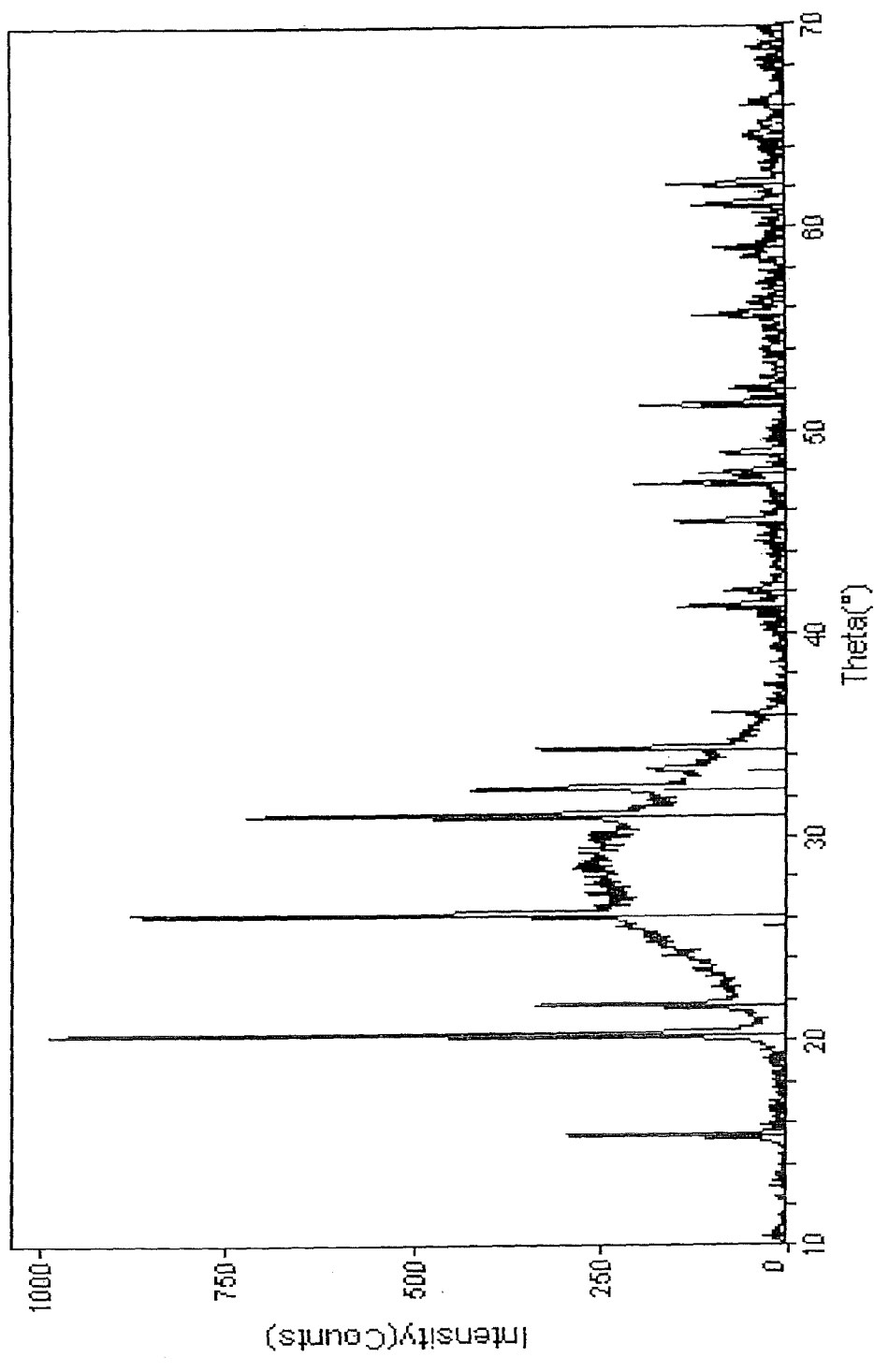
FIG. 3 shows an XRD pattern for sample CPO935-T-1-1 made in accordance with Example 2 at a 0.9:1 Zr:V ratio.

On occasion, there is found traces of unreacted Vanadium Pentoxide in the products of reactions run in accordance with Examples 1 or 2. For instance, the XRD pattern in FIG. 2 is of a product made in accordance with Example 1, trace Vanadium Pentoxide can be detected, but is below quantifiable levels in the reaction product. By contrast, FIG. 3 shows measurable Vanadium Pentoxide from an incomplete reaction from early termination of the process described in Example 2.

What is claimed is:

1. An amorphous zirconium vanadium oxide/hydroxide product, having a formula of from $Zr_2V_3O_{12}\cdot nH_2O$ to $Zr_3V_4O_{16}\cdot nH_2O$, wherein n is from 0 to 6, substantially free of salts selected from hexavalent chromium salts, alkali metal chlorides, alkali metal nitrates, alkali metal sulfates, and mixtures thereof.

2. The product of claim 1 having the formula $Zr_3V_4O_{16}\cdot nH_2O$.

3. A polyester primer composition which comprises the product of claim 2.

4. An epoxy primer which comprises the product of claim 2.

5. A polyester primer composition which comprises the product of claim 1.

6. Zinc or zinc-aluminum alloy coil stock coated with the primer of claim 5.

7. An epoxy primer which comprises the product of claim 1.

8. Aluminum alloy stock coated with the primer of claim 7 and top-coated with a color coat.

9. The amorphous product of claim 1 wherein the zirconium reactant is zirconium hydrate, and the product is deep orange in color.

10. The amorphous product of claim 1 wherein the zirconium reactant is the oxy-hydroxide or basic zirconium carbonate, and the vanadium reactant is vanadium pentoxide, and the product is yellow to buff in color.

11. The amorphous product of claim 1 in which the conductivity of a 10% slurry of the pigment in water is less than about 160 micro-siemens.

12. An amorphous product made by a reaction of zirconium hydroxide or zirconium basic carbonate with vanadium oxide in a high temperature aqueous slurry, wherein the reaction is carried out at a temperature between about 65° C. and about 130° C., and a pressure between ambient and about 5 MPa.

13. The amorphous product of claim 12 wherein the vanadium oxide reactant is vanadium pentoxide ($V_2O_5$).

14. The amorphous product of claim 12 wherein the reaction is between zirconium hydrate ($Zr(OH)_4$) and vanadium pentoxide ($V_2O_5$).

15. The amorphous product of claim 12 which is substantially free of salts selected from hexavalent chromium salts, alkali metal chlorides, alkali metal nitrates, alkali metal sulfates and mixtures thereof.

16. The amorphous product of claim 12 having elemental ratios between $Zr_2V_3$ and $Zr_3V_4$.

17. The amorphous product of claim 16 having the formula $Zr_3V_4O_{16}$.

* * * * *